(12) United States Patent
Wang et al.

(10) Patent No.: US 9,723,143 B2
(45) Date of Patent: Aug. 1, 2017

(54) METHODS AND SYSTEMS FOR AUTOMATED BUSINESS DIALING

(71) Applicant: SHANGHAI CHULE (COOTEK) INFORMATION TECHNOLOGY CO. LTD., Shanghai (CN)

(72) Inventors: Jialiang Wang, Shanghai (CN); Kan Zhang, Shanghai (CN); Yang Zhao, Shanghai (CN); Haichao Xie, Shanghai (CN)

(73) Assignee: SHANGHAI CHULE (COO TEK) INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 15/041,204

(22) Filed: Feb. 11, 2016

(65) Prior Publication Data
US 2016/0165048 A1    Jun. 9, 2016

Related U.S. Application Data

(63) Continuation of application No. 13/502,511, filed as application No. PCT/CN2010/080028 on Dec. 20, 2010, now Pat. No. 9,288,643.

(51) Int. Cl.
    *H04M 3/48*     (2006.01)
    *H04M 3/493*    (2006.01)
    (Continued)

(52) U.S. Cl.
    CPC ..... *H04M 3/4931* (2013.01); *H04M 1/27455* (2013.01); *H04M 1/274508* (2013.01);
    (Continued)

(58) Field of Classification Search
    None
    See application file for complete search history.

(56) References Cited

U.S. PATENT DOCUMENTS 6,157,954 A    12/2000   Moon et al.
6,717,936 B1    4/2004   Srinivasan
(Continued)

FOREIGN PATENT DOCUMENTS

CN    1592329    3/2005
CN    1604018    4/2005
(Continued)

OTHER PUBLICATIONS

An International Search Report, mailed by the State Intellectual Property Office of China on Sep. 8, 2011, in corresponding PCT application No. PCT/CN2010/080028, 3 pages total.
(Continued)

*Primary Examiner* — Diane Mizrahi
(74) *Attorney, Agent, or Firm* — Finnegan, Henderson, Farabow, Garrett & Dunner, L.L.P.

(57) ABSTRACT

Systems and methods consistent with the invention relate to automated business and service dialing. According to one exemplary embodiment, a business dialing system is disclosed. The system includes a memory configured to store a plurality of business objects containing phone numbers corresponding to a plurality of business entities. The system further includes a user input device configured to detect key presses. The system also includes a processor coupled to the user input device and the memory. The processor is configured to generate a key sequence and a number sequence based on the detected key presses. The processor is further configured to search the memory for business objects corresponding to the key sequence. The system further includes a display device configured to display the number sequence and the business objects. The user input interface is further configured to detect a selection of a business object, among the business objects, or a dial command. The processor is configured to perform an action associated with the selected
(Continued)

| | | |
|---|---|---|
| 310 | Display name | E.g. "Papa John's Pizza" |
| 320 | Keyword | E.g., "PAPAJOHNSPIZZA", "PJP" |
| 330 | Phone number | E.g., 800-777-7777 |
| 340 | Tags | E.g., "PIZZA", "RESTAURANT" |
| 350 | Popularity | E.g., ranking from 1 (least popular) to 10 (most popular). |
| 360 | Location | Location information, e.g., geo coordinates or region id |
| 370 | Preference | E.g., the number of calls made by the user |
| 380 | Action | E.g., a proxy number |

300 business object if the selection of the business object is detected, and dial the number sequence as a phone number if the dial command is detected.

20 Claims, 9 Drawing Sheets

(51) Int. Cl.
  *H04M 3/44* (2006.01)
  *H04W 4/16* (2009.01)
  *H04M 1/2745* (2006.01)
  *H04W 4/02* (2009.01)

(52) U.S. Cl.
  CPC ............... *H04M 1/274558* (2013.01); *H04M 1/274583* (2013.01); *H04M 3/44* (2013.01); *H04W 4/022* (2013.01); *H04W 4/023* (2013.01); *H04W 4/16* (2013.01); *H04M 2201/54* (2013.01); *H04M 2242/15* (2013.01); *H04M 2242/22* (2013.01); *H04M 2250/60* (2013.01); *H04M 2250/70* (2013.01)

(56) References Cited

U.S. PATENT DOCUMENTS

| | | | |
|---|---|---|---|
| 6,738,633 | B2 | 5/2004 | Kim et al. |
| 6,829,231 | B1 | 12/2004 | Wilson |
| 7,240,290 | B2 | 7/2007 | Melideo |
| 7,272,637 | B1 | 9/2007 | Himmelstein |
| 7,496,858 | B2 | 2/2009 | Melideo |
| 7,657,013 | B2 | 2/2010 | Lurie et al. |
| 9,288,643 | B2 * | 3/2016 | Wang ...................... H04M 3/44 |
| 2004/0234064 | A1 | 11/2004 | Melideo |
| 2005/0041649 | A1 | 2/2005 | Wilson |
| 2005/0050034 | A1 | 3/2005 | Kamiyama |
| 2006/0172777 | A1 | 8/2006 | Klein |
| 2007/0207791 | A1 | 9/2007 | Sasaki |
| 2008/0013702 | A1 | 1/2008 | Melideo |
| 2008/0177758 | A1 | 7/2008 | Eldering |
| 2009/0041224 | A1 | 2/2009 | Bychkov |
| 2009/0103459 | A1 | 4/2009 | Wilson |
| 2010/0005426 | A1 | 1/2010 | Van et al. |
| 2010/0010968 | A1 * | 1/2010 | Redlich ............. G06F 17/30672 707/E17.014 |
| 2010/0138445 | A1 | 6/2010 | Luoma |
| 2011/0276571 | A1 | 11/2011 | Yamada |
| 2013/0157723 | A1 | 6/2013 | Eldering |
| 2013/0184028 | A1 | 7/2013 | Bychkov |
| 2016/0050187 | A1 * | 2/2016 | Altberg ................. H04M 7/006 380/255 |

FOREIGN PATENT DOCUMENTS

| | | |
|---|---|---|
| CN | 101087330 A | 12/2007 |
| CN | 101521705 A | 9/2009 |
| CN | 101682667 A | 3/2010 |
| CN | 101848266 A | 9/2010 |
| EP | 2180665 A1 | 4/2010 |
| FR | 2897500 A1 | 2/2006 |
| JP | 8-331244 | 12/1996 |
| JP | 10-23178 | 1/1998 |
| JP | 2000-216874 A | 4/2000 |
| JP | 2002-259794 A | 9/2002 |
| JP | 2003-134236 A | 5/2003 |
| JP | 2005-78501 A | 3/2005 |
| JP | 2006-60768 A | 3/2006 |
| JP | 2006-279156 A | 10/2006 |
| JP | 2009-032209 A | 2/2009 |
| JP | 2010-212841 A1 | 9/2010 |
| KR | 10-2005-0028480 | 3/2005 |
| KR | 10-2007-0016536 | 2/2007 |
| WO | WO 2006/079074 A2 | 7/2006 |
| WO | WO 2008/070605 A1 | 6/2008 |
| WO | WO 2008/132535 A1 | 11/2008 |

OTHER PUBLICATIONS

A Written Opinion of the International Search Authority, mailed by the State Intellectual Property Office of China on Sep. 8, 2011, in corresponding PCT application No. PCT/CN2010/080028, 5 pages total.
China Office Action for CN Application No. 2010800706344 dated Mar. 2, 2015.
Second Office Action for Appln/Publ. No. 201080070634.4, mailed by the State Intellectual Property Office of People's Republic of China , document No. 100738 (27 pgs.).
Office Action mailed by the European Patent Office on Jan. 7, 2016 for European Patent Appln. No. 10861014.8-1851 (5 pgs.).
Office Action mailed by the European Patent Office on Feb. 3, 2015 for European Patent Appln. No. 10861014.8-1851 (6 pgs.).
Supplementary European Search Report mailed by the European Patent Office on Apr. 24, 2014, in European Patent Application No. EP10861014 (2 pgs.).
Office Action for European Patent Application No. 10861014.8 (4 pgs.).
Office Action for Japanese Patent Application No. 2013-544997 (w/translation), (3 pgs.).
Decision to Grant a Patent—Notice of Allowance for Japanese Patent Application No. 2013-544997, dated Aug. 14, 2015 (5 pgs.).
Notice of Final Rejection for Korean Patent Application No. 10-2013-7015828 dated Nov. 30, 2015 (3 pgs.), (w/translation—2 pgs.).
Response to European Office Action for European Patent Application No. 10861014.8, dated Nov. 26, 2014 (20 pgs.).

* cited by examiner

| | | |
|---|---|---|
| 310 | Display name | E.g. "Papa John's Pizza" |
| 320 | Keyword | E.g., "PAPAJOHNSPIZZA", "PJP" |
| 330 | Phone number | E.g., 800-777-7777 |
| 340 | Tags | E.g., "PIZZA", "RESTAURANT" |
| 350 | Popularity | E.g., ranking from 1 (least popular) to 10 (most popular). |
| 360 | Location | Location information, e.g., geo coordinates or region id |
| 370 | Preference | E.g., the number of calls made by the user |
| 380 | Action | E.g., a proxy number |

METHODS AND SYSTEMS FOR AUTOMATED BUSINESS DIALING

CROSS REFERENCE TO RELATED APPLICATIONS

This is a continuation of application Ser. No. 13/502,511, filed Jul. 23, 2013, which claims the benefit of PCT/CN2010/080028 filed Dec. 20, 2010, all of which are incorporated herein by reference in its entirety.

TECHNICAL FIELD

The present invention relates to methods and systems for automated business dialing. More particularly, the invention relates to methods and systems for automated searching and dialing a business phone number from a portable device.

BACKGROUND

Portable communication devices, such as mobile phones, are widely used for efficient and instant communication and information transmission. Such portable devices may have a phonebook stored in its memory, which includes phone numbers of a user's contacts, and sometimes, phone numbers of businesses frequently used by the user. For example, the user may order pizza from a pizza eatery, e.g., Papa John's™, every Friday, and the phone number may be stored in the mobile phone.

However, the user may sometimes want to dial a business phone number that is not saved in the phonebook. For example, the user may want to try Domino's™ pizza for the first time. As another example, the user may travel outside of his home city, and want to order from a local Papa John's™ store. Using a conventional mobile phone, the user has to manually find the phone number first, remember or record it, and then dial it on the mobile phone. For example, the user may have to search online using his mobile phone, look at a yellow page, or call a phone number lookup service (e.g., a 411 service), to find the phone number. Manual phone number searches may be time-consuming and inconvenient for the user.

Accordingly, some new dialing methods and systems have been developed to improve the user experience on business phone number dialing. For example, after the user finds the phone number through an online search using the mobile phone, a dialogue box may show up on the phone screen, asking the user if he wants to dial the phone number. Upon user confirmation, the phone number will be automatically dialed. Although such methods and systems may improve user experience by saving effort to remember/record and manually dial the phone number, they are still suboptimal. For example, the user still has to use a web browsing application on the mobile phone and manually lookup the phone number. In addition, such methods always requires the Internet connection and doesn't support the "offline" mode where the Internet is not always available to the user (e.g., roaming in a different country).

Accordingly, there exists a need for an improved method and system for efficient business dialing.

SUMMARY

Systems and methods consistent with the invention relate to automated business and service dialing. According to one exemplary embodiment, a business dialing system is disclosed. The system includes a memory configured to store a plurality of business objects containing phone numbers corresponding to a plurality of business entities. The system further includes a user input device configured to detect key presses. The system also includes a processor coupled to the user input device and the memory. The processor is configured to generate a key sequence and a number sequence based on the detected key presses. The processor is further configured to search the memory for business objects corresponding to the key sequence. The system further includes a display device configured to display the number sequence and the business objects. The user input interface is further configured to detect a selection of a business object, among the business objects, or a dial command. The processor is configured to perform an action associated with the selected business object if the selection of the business object is detected, and dial the number sequence as a phone number if the dial command is detected.

It is to be understood that both the foregoing general description and the following detailed description are exemplary and explanatory only and are not restrictive of the claimed invention.

BRIEF DESCRIPTION OF THE DRAWINGS

The accompanying drawings, which are incorporated in and constitute a part of this specification, illustrate several embodiments consistent with the invention and together with the description, serve to explain the principles of the invention. In the drawings.

DESCRIPTION OF THE EMBODIMENTS

The following description refers to the accompanying drawings. Wherever possible, the same reference numbers will be used throughout the drawings to refer to the same or similar parts. While several exemplary embodiments and features of the invention are described herein, modifications, adaptations, and other implementations are possible without departing from the spirit and scope of the invention. For example, substitutions, additions, or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Figure 1:
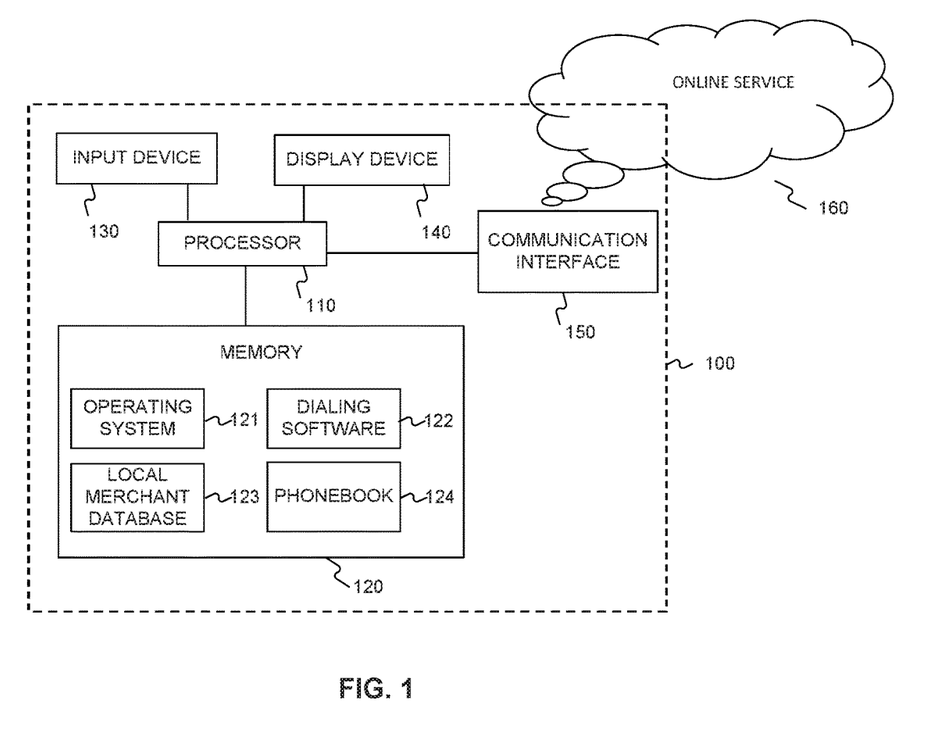
FIG. 1 illustrates a block diagram of an exemplary business dialer system, consistent with an embodiment of the present invention.

FIG. 1 illustrates a block diagram of an exemplary business dialer system 100. Consistent with some embodiments, business dialer system 100 may be a portable communication device that may be carried by a user to various locations. For example, business dialer system 100 may be a mobile phone, a smart phone, or a PDA. Business dialer system 100 may be connected to a telecommunication network, including a telephone network (such as a 3G network), and/or an Internet (such as a Wi-Fi™). The user may use business dialer system 100 to connect and communicate with a terminal device of a business, through the telecommunication network. Consistent with some embodiments, business dialer system 100 may be configured to search and obtain a number of the business when it is unknown to the user.

Consistent with embodiments of the present invention, the term "business" is used broadly to include any person or entity that has business contact information (such as phone number, email, address or website) listed publicly, such as on the Internet or in a yellow book. In some embodiments, a business may be a business who is in the business of trading commodities. For example, the business may be a retail business who sells the commodity to consumers, or a wholesale business who operates in the chain between the producers and the retail businesses. A business may also be a producer who produces and sells the commodities, such as a pizza eatery, a bakery, or a floral shop. In some embodiments, the term "business" may also be used to refer to any service providers, such as a construction contractor, a lawn service company, a dry cleaner, a doctor's office, and a law firm. In some embodiments, the term "business" may further include government agencies and non-profit organizations, such as charities, trade unions, museums, and public arts organizations.

As shown in FIG. 1, business dialer system 100 may include a processor 110, a memory module 120, an input device 130, a display device 140, and a communication interface 150. Processor 110 can be a central processing unit ("CPU") or a graphic processing unit ("GPU"). Depending on the type of hardware used, processor 110 can include one or more printed circuit boards or a microprocessor chip. Processor 110 can execute sequences of computer program instructions to perform various methods that will be explained in greater detail below.

Memory module 120 can include, among other things, a random access memory ("RAM") and a read-only memory ("ROM"). The computer program instructions can be accessed and read from the ROM, or any other suitable memory location, and loaded into the RAM for execution by processor 120. For example, memory module 120 may store one or more software applications. Software applications stored in memory module 120 may comprise operating system 121 for common computer systems as well as for software-controlled devices. Further, memory module 120 may store an entire software application or only a part of a software application that is executable by processor 110. For example, memory module 120 may store dialing software 122 that may be executed by processor 110 and perform automated business dialing.

Figure 3:
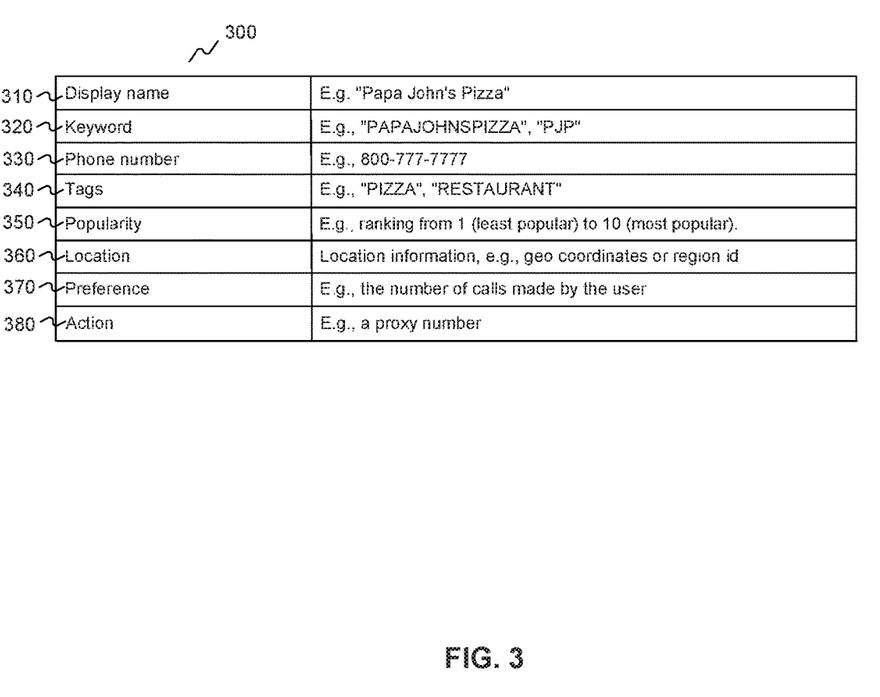
FIG. 3 shows an exemplary business object stored in a database of the business dialer system, consistent with an embodiment of the present invention.

In some embodiments, memory module 120 may also store master data, user data, application data, and/or program code. For example, memory module 120 may store a local business database 123 and a phonebook 124. In some embodiments, local business database 123 may include one or more business objects. For example, FIG. 3 shows an exemplary business object that includes one or more data fields storing information descriptive of the respective business. The term "database" is used to broadly include any data format to store data. In some embodiments, phonebook 124 may include information of the user's existing contacts. For example, the user may save in phonebook 124 phone numbers and/or email addresses of his family and friends, as well as frequently used businesses.

Figure 2A:
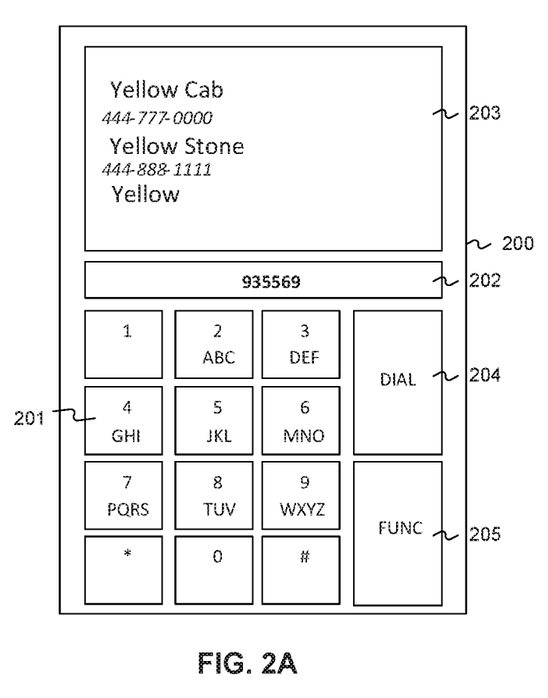
FIGS. 2A-2C each depicts a user interface of an exemplary business dialer system, consistent with an embodiment of the invention.
Figure 2B:
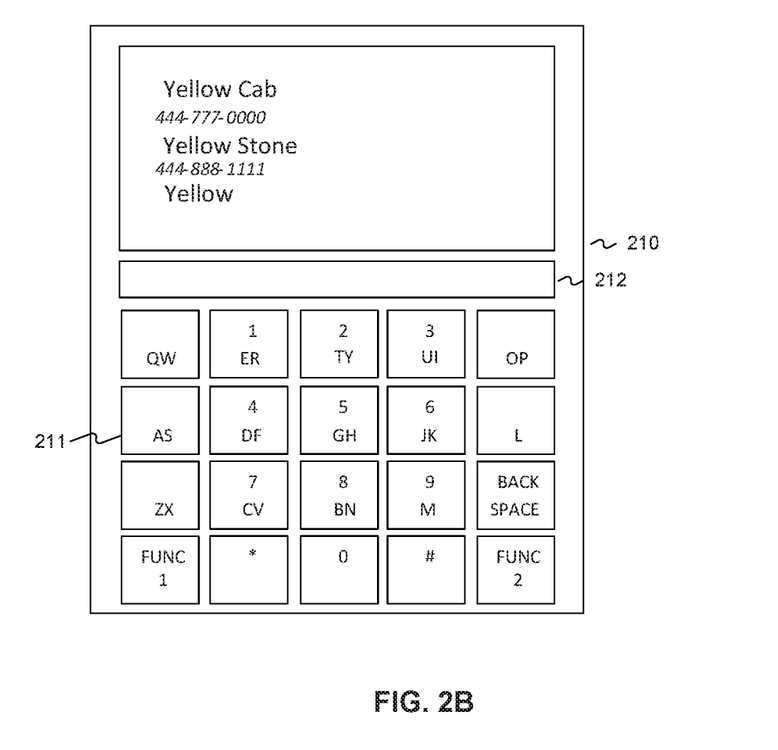
Figure 2C:
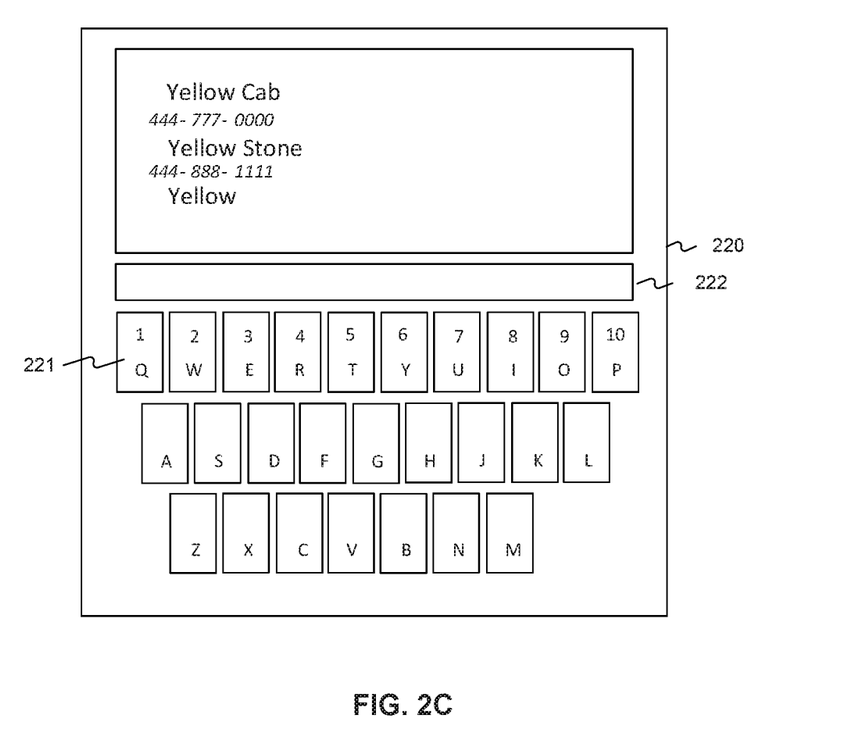

In some embodiments, input device 130 and display device 140 may be coupled to processor 110 through appropriate interfacing circuitry. In some embodiments, input device 130 may be a hardware keyboard, a keypad, or a touch screen. For example, input device 130 may be a dial pad of a mobile phone as shown in FIG. 2A. In some embodiments, input device may also be a Full QWERTY keyboard like PC (as shown in FIG. 2C), or a Half-QWERTY compact keyboard with two letters on each key (as shown in FIG. 2B). In some embodiments, input device 130 may include a number of physical or virtual keys, each corresponding to a number and/or one or more letters. The user may press the keys of input device 130 to input information to business dialer system 100. In some embodiments, input device 130 may also include certain function buttons, through which the user may initiate certain processes performed by business dialer system 100, or otherwise interact with business dialer system 100.

Display device 140 may include one or more display screens that display texts or graphics to the user. For example, display device 140 may display a GUI. Consistent with some embodiments, display device 140 may include two display screens, one for displaying the information input via input device 130, and another for displaying the business objects related to the user input, as shown in FIG. 2A. In some embodiments, input device 130 may be implemented as a keyboard GUI on display device 140, such as on a touch screen device.

Communication interface 150 may provide communication connections such that business dialer system 100 may exchange information with certain external devices. Consistent with one embodiment, communication interface 150 may include a network interface (not shown) configured to transmit and receive information from an online service 160. Consistent with some embodiments, online service 160 can be implemented as a web service on the Internet, a SMS gateway, or a service only available on the carrier network. Communication interface 150 may further include a wireless communication interface (not shown) to transmit and receive telephone communication signals to and from another terminal device via a communication network.

FIG. 2A depicts a user interface ("UI") 200 of the exemplary business dialer system 100. UI 200 of business dialer system 100 may be configured to allow a user to quickly enter business names without having to remember the business numbers or to search through a yellow page. As shown in FIG. 2A, UI 200 may include several screen areas, including, for example, a dial pad 201, an input display area 202, a search result area 203, a dial button 204, and a function button 205.

Dial pad 201 may include a plurality of physical or virtual keys, as shown in FIG. 2A. A key may correspond to a number, a symbol, and/or letters. For example, FIG. 2A shows that a key may correspond to number "4" as well as letters "G," "H," and "I." For example, when a user wants to call "Yellow Cab" for a taxi, the user may press the keys "WX<u>Y</u>Z (9)", "D<u>E</u>F (3)", "JK<u>L</u> (5)", "JK<u>L</u> (5)", "MN<u>O</u> (6)", "<u>W</u>XYZ (9)" in sequence from dial pad 201. Alternatively, the user may also press the keys associated with "C", "A", "B" to find "Yellow Cab", as "CAB" is also a part of the business names.

Once the user presses a key on dial pad 201, the key is appended to a key sequence. The key sequence inputted by the user may be interpreted by processor 110 as a number sequence and one or more letter sequences simultaneously. For example, the key sequence ["WX<u>Y</u>Z (9)", "D<u>E</u>F (3)", "JK<u>L</u> (5)", "JK<u>L</u> (5)", "MN<u>O</u> (6)", "<u>W</u>XYZ (9)"] may be interpreted as the number sequence "935569" and the letter sequence "YELLOW." Input display area 202 may be configured to display the number sequence "935569". Search result area 203 may be configured to display all the business results related to the letter sequence "YELLOW", such as "Yellow Cab" and "Yellow Stone". In some embodiments, search result area 203 may also display the phone numbers that contains the number sequence, for example "419-355-6900".

Because a key may correspond to a plurality of letters, the key sequence may be ambiguous and may represent different letter sequences. In some embodiments, business dialer system 100 may search the key sequence in local business database 123 and identify business objects that are related to the key sequence. For example, in response to the user's input of the key sequence ["WX<u>Y</u>Z (9)", "D<u>E</u>F (3)", "JK<u>L</u> (5)", "JK<u>L</u> (5)", "MN<u>O</u> (6)", "<u>W</u>XYZ (9)"] business dialer system 100 may identify business objects, such as "YELLOW CAB" and "YELLOW STONE," which contains the keyword "YELLOW" that are related to the key sequence.

It is contemplated that the dial pad may include different numbers of keys and/or different types of keys than those shown in FIG. 2A. In addition, the keys may be arranged differently from those shown in FIG. 2A. Consistent with some embodiments, certain keys included in dial pad 211 may not correspond to any number. For example, exemplary UI 210 depicted in FIG. 2B may include, among other things, a dial pad 211 and an input display area 212. When the key "Q W" in dial pad 211 is pressed, it does not correspond to any number. Accordingly, input display area 212 may be left blank and the key sequence may be only interpreted as a letter sequence. As another example, exemplary UI 220 depicted in FIG. 2C may include, among other things, a dial pad 221 and an input display area 222. The keys in dial 221 may resemble a keyboard of a personal computer. Each key may correspond to a unique letter, and certain keys may also correspond to a number.

Consistent with some embodiment, the system may simultaneously search the key sequence in the phone contact book. For example, for the key sequence ["WX<u>Y</u>Z (9)", "D EF (3)", "JK<u>L</u> (5)", "JK<u>L</u> (5)", "MN<u>O</u> (6)", "<u>W</u>XYZ (9)"], the contacts with names containing "YELLOW" or phone numbers containing "935569" may be found. The contacts related to the key sequence may be displayed along with other business names in search result area 203. In some embodiments, contact results may be differentiated from business results by different formats, such as color or font.

Consistent with some embodiments, business objects having one or more data fields that are associated with the input key sequence may be identified. FIG. 3 shows an exemplary business object 300 stored in a database of business dialer system 100. As shown in FIG. 3, exemplary data fields may include a display name field 310, a keyword field 320, a phone number field 330, a tag field 340, a popularity field 350, a location field 360, a preference field 370, and an action field 380. It is contemplated that business object 300 may include less or more data fields as those shown in FIG. 3. In some embodiments, additional data fields may be added or linked to the business objects, such as detail description, address, driving direction, and customer feedback.

As shown in FIG. 3, display name field 310 may record the name of the business, such as "Yellow Cab™," or "Papa John's™ Pizza." The user may be able to find the phone number of "Papa John's™ Pizza" by inputting a part of the display name, i.e., "Papa," "John's," or "Pizza." Display name field may be indexed to be searchable by key sequence.

Business object 300 may further include a keyword field 320 that stores the business' short names or keywords. In many cases, a business may have one or more short names. For example, "Papa John's™ Pizza" may be abbreviated as "PJP" or "PPJ," and "United Postal Office Service™" may be abbreviated as "USPS™". Business dialer system 100 may recognize these short names or keywords by associating them with the corresponding businesses in the respective business objects. Keyword field may also be indexed to be searchable by key sequence.

Business object 300 may also include a phone number field 330. The phone number may be in a form of a direct dial number, a 800 toll free number, or a number with letters such as 1-866-GOPIZZA. Consistent with some embodiments, the user may input a part of a business phone number to get the business' complete number. For example, user can dial "444777" to retrieve "Yellow Cab (444-777-0000)." Business dialer system 100 may compare the number sequence input by the user with phone number field 330 during the search, in order to identify the desired business objects. In some embodiments, the phone number stored in phone number field 330 may not necessarily be the actual number to be dialed. For example, a proxy number may be dialed to redirect the user to the business. Such proxy number may be recorded in action field 380. Phone number field 330 may also be indexed to be searchable by key sequence.

Business object 300 may further include a tag field 340 indicative of a type or a category of the business. For example, in some cases, user may not have a specific business name to call, but is looking for a type of service or product instead. For example, instead of inputting "Pizza Hut" or "Papa John's", user may input "pizza". Accordingly, "pizza" may be stored in tag field 340 of the "Papa John's™ Pizza" business object. It is noted that a same tag may be shared by one or more business objects and that a business object 300 may have multiple tags. Therefore, when "pizza" is input by the user, business dialer system 100 may identify all businesses that are related to "pizza," such as "Pizza Hut™", "Papa John's™" and "Domino's™," etc. Tag field 340 may also be indexed to be searchable by key sequence.

Consistent with some embodiments, in the case that the business name is in a foreign language that is not English letter based, display name field 310 may store the name in foreign language but link it to an associated name expressed with English letters. In an example of Chinese language, the Chinese characters may be stored in display name field 310 for China Eastern Airline™. Display name field 310 may then be linked to its English name "China Eastern Airline" or Pinyin "DongFangHangKong." Accordingly, a short name in Pinyin "DongHang" or an abbreviated Pinyin "DFHK" may be stored in keyword field 320. A Pinyin of the tag "HangKongGongSi" may be stored in tag field 340. As a result, the user may input the name "DongFangHuangKong," the short name "Donghang" or "DFHK", or the tag "HangKongGongSi" in Pinyin to get the same search result of China Eastern Airline™, alone or along with some other Chinese airlines. In some languages, accent letters may be displayed on or associated with some of the keys. In some other languages, accent letters may be linked to the corresponding English letters. In some other languages, such as Korean, Japanese, or Chinese, local characters may be associated with each key, and search may be performed based on the local character sequence represented by the key sequence.

The search results may be displayed in search result area 203. For example, the display name and phone number of the identified business may be displayed. In some embodiments, business objects may be displayed in search result area 203 in a ranked order. For example, the business objects may be ranked based on one or more data fields included in the business objects, such as a popularity field 350, a location field 360, and a preference field 370, as shown in FIG. 3.

Popularity field 350 may indicate a level of popularity associated with the business. In some embodiments, popularity of a business may be a public ranking, such as the consumer review of the business. As shown in FIG. 3, the popularity may be recorded in popularity field 350 as a ranking, for example, from 1 (least popular) to 10 (most popular). Consistent with some embodiments, the business objects displayed in search result area 203 may be ordered according to the rank, such that most popular business is displayed first.

Location field 360 may indicate a geographic location of the business. For example, location field 360 may record the business address of the business, including street number, street name, city name, state name, and a zip code. In some embodiments, location field 360 may record a general region ID instead of the detailed address. In some embodiments, location field 360 may further record a geographic coordinates of the business, including latitude, longitude, and ellipsoid height, that may be readily used by a GPS navigation system. In some embodiments, location field 360 may be a combination of region ID and a specific geographic coordinates. Consistent with some embodiments, the business objects displayed in search result area 203 may be ordered according to the location, such that a business having a location closest to the user's current location is displayed first. Consistent with some embodiments, the search scope is limited to a certain location area, or within a certain distance from user's current location, such that a business having a location out of the user-specified area may not be displayed.

Preference field 370 stores the user's preference towards the business. It may include the number of calls made by the user in the past, which may indicate how often the user has been calling a particular business. If the user called Papa John's™ ten times in the last month, and called Pizza Hut™ only once, it is more likely that the user prefers Papa John's™ when he inputs "pizza" from dial pad 201. In some embodiments, preference field may also include the rank given by the user to the business. Therefore, the business objects displayed in search result area 203 may be ordered according to the user preference, such that a business associated with the highest preference is displayed first. Preference field 370 may be updated on a regular basis or upon user instruction.

Action field 380 may store the action to be taken once business object 300 is selected by the user. In some embodiments, action field 380 may store the proxy phone number to be dialed which may redirect the user to the business. In some embodiments, action field 380 may store actions such as opening an URL, sending a SMS or email, or other actions related to business object 300.

In some embodiments, the data fields stored in local business database 123 may be limited because the storage space of memory module 120 on a portable device is usually small. For example, only data fields that are related to search of the businesses and/or the ranking of the businesses may be stored initially. Additional data fields of a selected business object may be downloaded and appended to the business object in a later stage.

As shown in FIG. 2A, UI 200 may include a search result area 203. The search results related to the key sequence may be displayed in this area. When an object in search result area 203 is selected, a specific action related to the object may be taken. For example, the phone number or the proxy number specified in action field 380 may be dialed, or the action specified in field 380 may be performed. In some embodiments, before user inputs any key sequence, search result area 203 may list the call log history.

In some embodiments, in addition to searching local database, an online search may be performed. The online search results may also be displayed in search result area 203. For example, the search results may be displayed together with the local search results or in another tab.

Consistent with some embodiments, the search results may be ordered by multiple factors, such as popularity, location, preference and other factors. A weighted metric may be calculated based on each factor and its weight, which determines the search rank.

As shown in FIG. 2A, UI 200 may further include a dial button 204. Any time during user input, the user may press dial button 204 to initiate phone dialing. Once dial button 204 is pressed, it will be detected by processor 110, and processor 110 may automatically dial the number sequence in input display area 202 as a phone number. Consistent with some embodiments, when the user wants to dial a number as input while using the business dialing application, he does not have to switch to a different dialing mode or dialing application. For example, in FIG. 2A, when the user presses dial button 204, the number "935569" will be dialed. In some embodiments, the on-screen dial button may not exist, such as shown in FIG. 2B and FIG. 2C. Instead, user may perform the dialing action by pressing the input display area or perform a pre-defined action, such as a voice commend, a shaking of the phone, or a swiping on the touch screen.

UI 200 may further include a function button 205. Once the user presses function button 205, a GUI (not shown) or a drop down menu (not shown) may show additional options in search result area 203. For example, an online search option may be offered to the user to search for more businesses online in addition to those in local business database 123. A database update option may be offered to update the business objects in local business database 123, for example, when the user travels outside of his home city. An additional information search option may be offered once the user selects a business from search result area 203, for downloading additional information regarding the business, such as a map or customer reviews of the business. A business data upload option may be offered so that the user can upload the business object in local business database 123 to a server or another terminal device.

It is contemplated that UI 200 may include less or more screen areas than those shown in FIGS. 2A, 2B, and 2C, to facilitate user interactions. It is also contemplated that UI 200 may include screen areas of other formats or functionalities than those shown in FIGS. 2A, 2B, and 2C.

Figure 4:
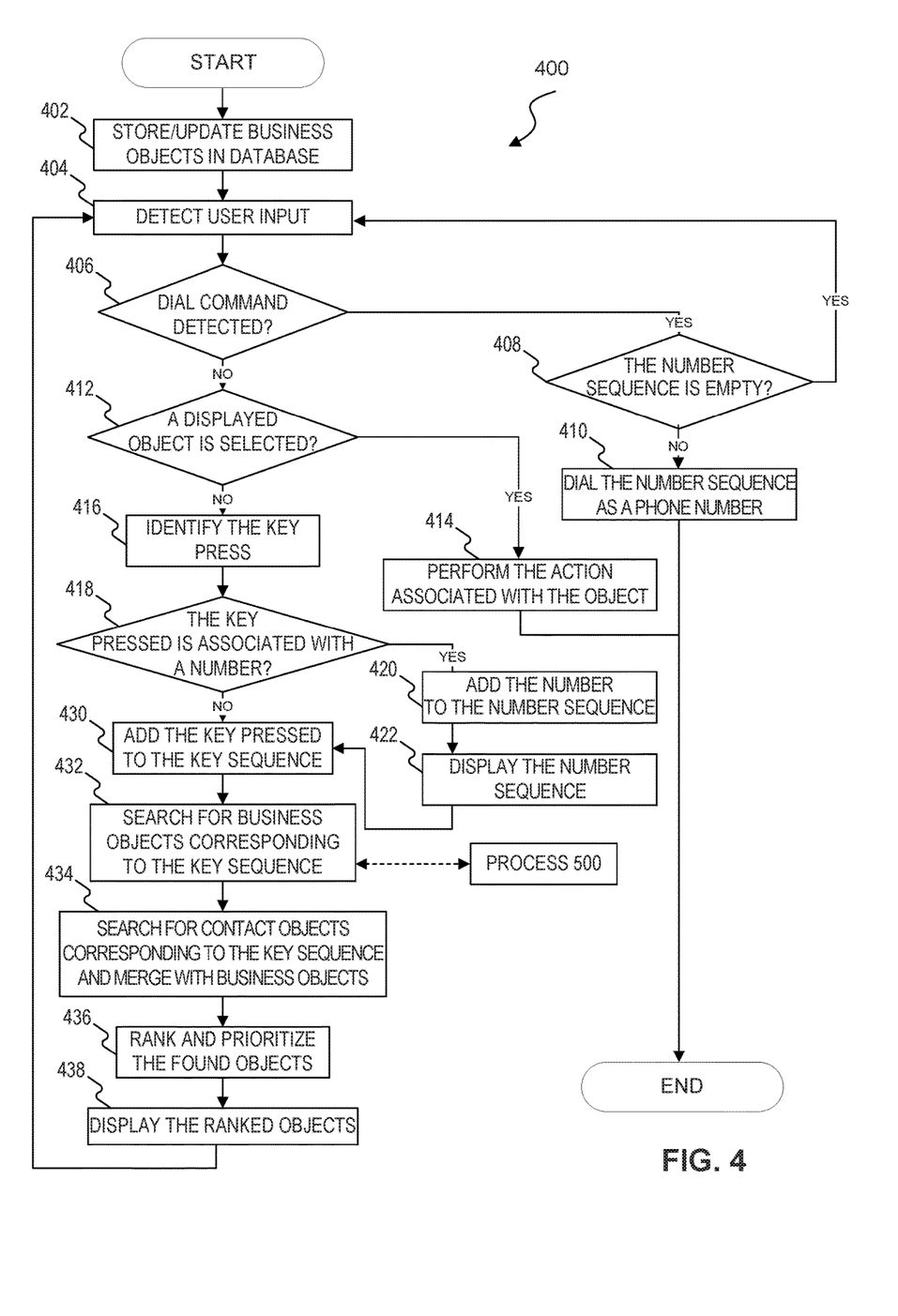
FIG. 4 is an exemplary flow chart for an automated business dialing process using a business dialer system, consistent with the present invention.

One or more components of business dialer system 100 may be used to implement a process for searching and dialing a business phone number. For example, FIG. 4 shows an exemplary flow chart for an automated business dialing process 400. Process 400 may begin when business objects are stored or updated (if previously stored) in local business database 123 (step 402). The update of the local business database may also be performed upon specific triggering event, as described in exemplary process 600 in connection with FIG. 6.

Processor 110 may detect a user input from the input device 120 (step 404). A user input may be a key press, a gesture or click on touch screen, a motion of the device, or a voice command. The user input may further be interpreted by Processor 110 as a dial command, a selection of an object, or a key press.

After a user input is detected, processor 110 may examine whether the user input indicates a dial command (step 406). For example, the dial command may be a press on dial button 204, a gesture on touch screen, or a voice command. If a dial command is detected (step 406: yes), processor 110 may further check whether the number sequence is empty (step 408). If the number sequence is empty (step 408: yes), processor 110 may ignore the dial command and go back to step 404; otherwise (step 408: no), processor 110 may automatically dial the number sequence as a phone number (step 410) and process 400 may terminate. For example, if "1234567" is entered as the number sequence, processor 110 may automatically dial it as a local number, and if "1234767890" is entered, processor 110 may automatically dial it as a domestic number with area code.

If a dial command is not detected (step 406: no), processor 110 may then monitor if a displayed object is selected by the user (step 412). In some embodiments, the object may be a business object located by the search conducted in step 432. The object may also be a contact object located by the search conducted in step 434. If an object is selected (step 412: yes), processor 110 may automatically perform the action associated with the object (step 414), such as dialing the phone number or the proxy number of the object, composing an email, visiting a URL, or sending a SMS. Such action may be specified by action field 380, based on predetermined rules, or user settings. For example, if the user selects "YELLOW CAB" in FIG. 2A, processor 110 may dial the number "444-777-0000." Process 400 may then terminate.

If no object is selected (step 412: no), the detected user input may be deemed a key press. Processor 110 may identify the number and/or letters associated with the key (step 416) and determine if a number is associated with the key (step 418). If a number is associated with the key (step 418: yes), processor 110 may add the number to the number sequence (step 420), and display the updated number sequence in input display area 202. In some embodiments, some keys may not be associated with any number. For example, in FIG. 2B, key "Q W" is not associated with any number. When a key not associated with any number is pressed, the number sequence may not be updated. In some embodiments, the number sequence previously displayed in input display are 202 may be cleared once a key not associated with a number is pressed, because it may indicate that the user may not intend to input a phone number.

In step 430, the key pressed is added to the key sequence. For example, processor 110 may add key "WXYZ (9)" to an existing key sequence "WXYZ (9)", "DEF (3)", "JKL (5)", "JKL (5)", "MNO (6)"] to obtain the key sequence "WXYZ (9)", "DEF (3)", "JKL (5)", "JKL (5)", "MNO (6)", "WXYZ (9)"] in response to a press of the "WXYZ (9)" key.

Figure 5:
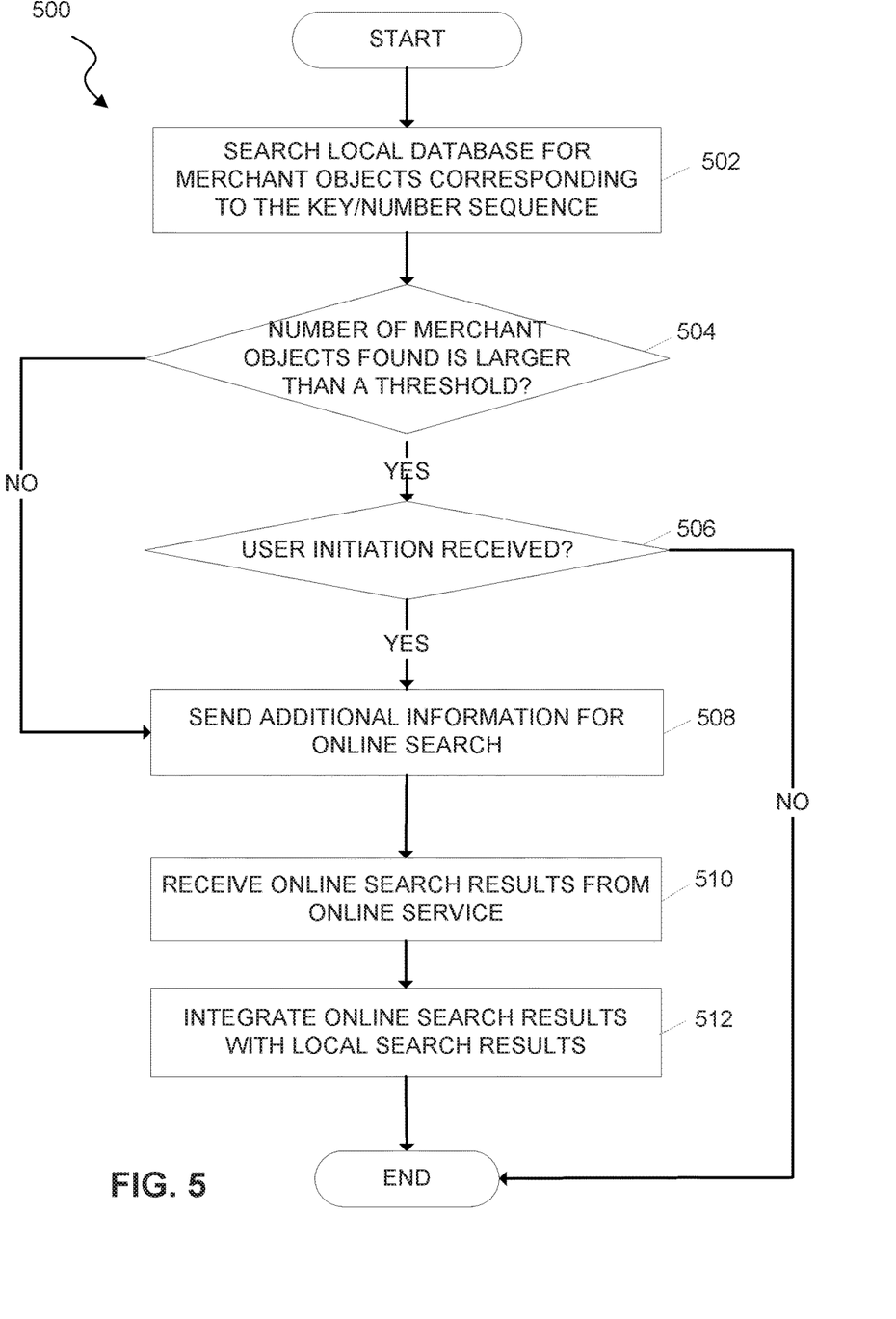
FIG. 5 is an exemplary flow chart for performing an online search during a business dialing, consistent with the present invention.

In step 432, processor 110 may search for business objects based on the key sequence. In some embodiments, processor 110 may compare the key sequence with the index of the searchable data fields in business objects. Objects with one or more data fields corresponding to the key sequence may be found. For example, if the key sequence is ["PQRS (7)", "GHI (4)", "WXYZ (9)", "WXYZ (9)", "ABC (2)"], the business objects with name, tag or other indexed fields containing "pizza" may be found. In some embodiments, processor 110 may also compare the number sequence with the phone number field in business object. Objects with phone numbers that contain the number sequence may be found. In some embodiments, processor 110 may only search in local business database 123. In some other embodiments, processor 110 may additionally perform an online search for supplemental business information, either automatically or upon user initiation/approval, as described in process 500.

In step 434, processor may search for contact objects in phone book based on the key sequence. In some embodiments, step 434 may be performed in parallel with step 432, so that the user may search for both business and contacts at the same time without having to switch context. Contact objects with names corresponding to the key sequence or phone numbers containing the number sequence may be located. The contact objects located may be merged with the business objects, or displayed in a format distinguishable from the one for the business objects. In some embodiments, step 434 may be optional and may be skipped by process 400.

In step 436, the objects found during the search may be ranked and prioritized. In some embodiments, the business objects may be ranked based on one or more of the data fields. For example, the business objects may be ranked according to their popularities recorded in popularity field 350, according to their locations recorded in location field 360, and/or according to the preference field 370. In some embodiments, the online search results may automatically have a lower rank than the local search results, regardless of the values in the above data fields. In some embodiments, a metric may be calculated based on multiple factors, and the ranking may be based on the metric.

The objects may be displayed in search result area 203 in the ranked order (step 438). In some embodiments, the display name and phone number of the business may be displayed, as shown FIGS. 2A, 2B, and 2C. It is contemplated that more or less information may be displayed for each business object.

An exemplary process 500 for implementing step 432 is disclosed in connection with FIG. 5. In process 500, processor 110 may first search local business database 123 for objects corresponding to the key/number sequence (step 502). For example, if the input number sequence is "1234," and phone number field 330 of a object is "1234567" or "5671234," they may be considered matching, and the respective business object may be identified by processor 110. Likewise, the key sequence may be compared with data fields including display name field 310, keyword field 320, and tag field 340.

Processor 110 may then count the number of business objects identified through the local search and compare it to a predetermined threshold number (step 504). If the number of business objects found is smaller than the threshold number (step 504: no), processor 110 may automatically initiate an online search to obtain supplemental business data (step 508). For example, the threshold number may be 0, such that online search is performed when no business object is found in local business database 123. In some embodiments, different threshold numbers may be based on the search criteria used. For example, if the search is based on display name or phone number, the threshold number may be set low, such as 0 or 1, as the user is likely looking for a particular business. Otherwise, if the search is based on a tag, or a partial name, the threshold number may be set relatively high, such as 5, to give the user sufficient options to choose from. It is contemplated that the threshold number could be any suitable number, preprogrammed in business dialer system 100. In some embodiments, the threshold number may also be infinite (for example, programmatically set to "−1"), so that online search is always triggered regardless of the number of search results.

If the number of business objects found is larger than the threshold number (step 504: yes), an option to perform an online search may be provided to the user. The user may choose to initiate the online search or skip the online search. For example, if the user is in a foreign country and online search would result in high roaming charges, he may decline the option of online search and use the local search result. User may also specify rules for whether to perform an online search in advance, so that online search may be performed or skipped automatically.

Processor 110 may detect if a user initiation is received (step 506). In some embodiments, user initiation may be required regardless the result of step 504, for example, for cost reasons. If a user initiation is not received, i.e., the user declines the option of online search (step 506: no), process 500 may terminate and only local search results are displayed. If a user initiation is received, i.e., the user accepts the option of online search (step 506: yes), a real-time search may be performed using online service 160. In some embodiments, processor 110 may establish a connection with online service 160 via communication interface 150, and send the key/number sequence to online service 160. In some embodiments, processor 110 may send additional information to facilitate the online search, such as the user's current location or and user preference (step 508).

Online search results may be downloaded and received from online service 160 (step 510). In some embodiments, the search results may be downloaded as a data file. When the data size is large, the data file may be compressed before downloading. In some embodiments, processor 110 may create new business objects based on the received business data. The online search results may be integrated with local search results (step 512). For example, the online search results may be appended after the local search results, or mixed with the local search results. After that, the online search may terminate and internet connection may be closed. Accordingly, process 500 may end.

Consistent with some embodiments of the present invention, business data stored in local business database 123 may be updated at the beginning of process 400, such as in step 402, or after process 400, or routinely regardless of whether process 400 is performed. For example, the business data may be updated automatically periodically, such as every day or every week. User may also manually initiate the update.

Consistent with some other embodiments, the business data may be updated upon occurrence of certain conditions that requires or prefers an update. In some embodiments, the update may be performed when the current location of the user is at least a threshold distance away from his home city. For example, the user may travel from New York City, his home city, to Huston for a business trip. The existing business objects stored in local business database 123 may likely not be useful to him in Huston, so that an update may be needed to obtain new data for Huston businesses. In some embodiments, business information related to some of the business objects stored in local business database 123 may have been changed. For example, a local florist may have moved to a different shopping plaza and/or have changed her phone number. An update may also be preferred in this case to give the user accurate information during the next business dialing.

Figure 6:
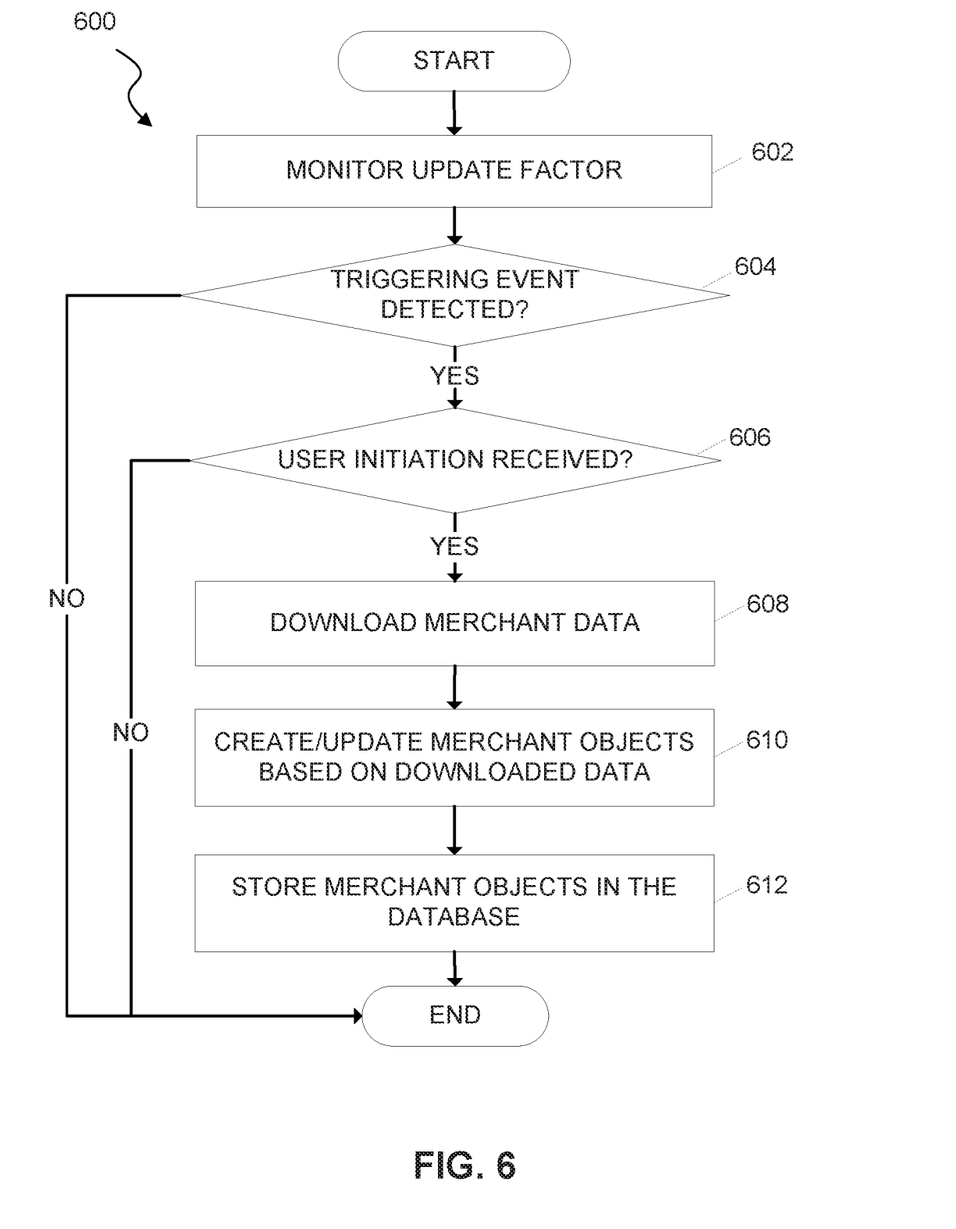
FIG. 6 is an exemplary flow chart for updating business objects stored on the business dialer system, consistent with the present invention.

FIG. 6 is a flow chart of an exemplary process 600 for updating local business database 123. Processor 110 may monitor one or more update factors (step 602). For example, the update factor may be a predetermined time interval, a user location, or a change of business information. Processor 110 may detect a triggering event based on the update factors (step 604). For example, processor 110 may determine if the update factor meets a predetermined criteria. For example, processor 110 may determine if a predetermined time interval has expired, if the user location is at least a threshold distance away from his home location, or if business information related to any business object in the database has changed. If no triggering event is detected (step 604: no), process 600 may terminate.

Otherwise (step 604: yes), an option to update the database may be offered to the user, e.g., on search result area 203 of UI 200. The user may initiate the update by pressing function button 205. Processor 110 may monitor if a user initiation is received (step 606). If the user declines to update (step 606: no), process 600 may terminate. If user initializes an update (step 606: yes), processor 110 may establish a connection with online service 160 via communication interface 150, and download business data from online service 160 (step 608). In some embodiments, business data related to local franchises of a business may be downloaded. For example, if the user calls Papa John's™ frequently in his home city, business data of local Papa John's™ pizza stores may be downloaded.

Processor 110 may create or update business objects based on the downloaded data (step 610). For example, business objects such business object 300 may be created, or one or more data fields of business object 300 may be changed, or one or more data fields may be added to business object 300. The new or updated business objects may be stored in local business database 123 (step 612), after which process 600 may terminate.

Figure 7:
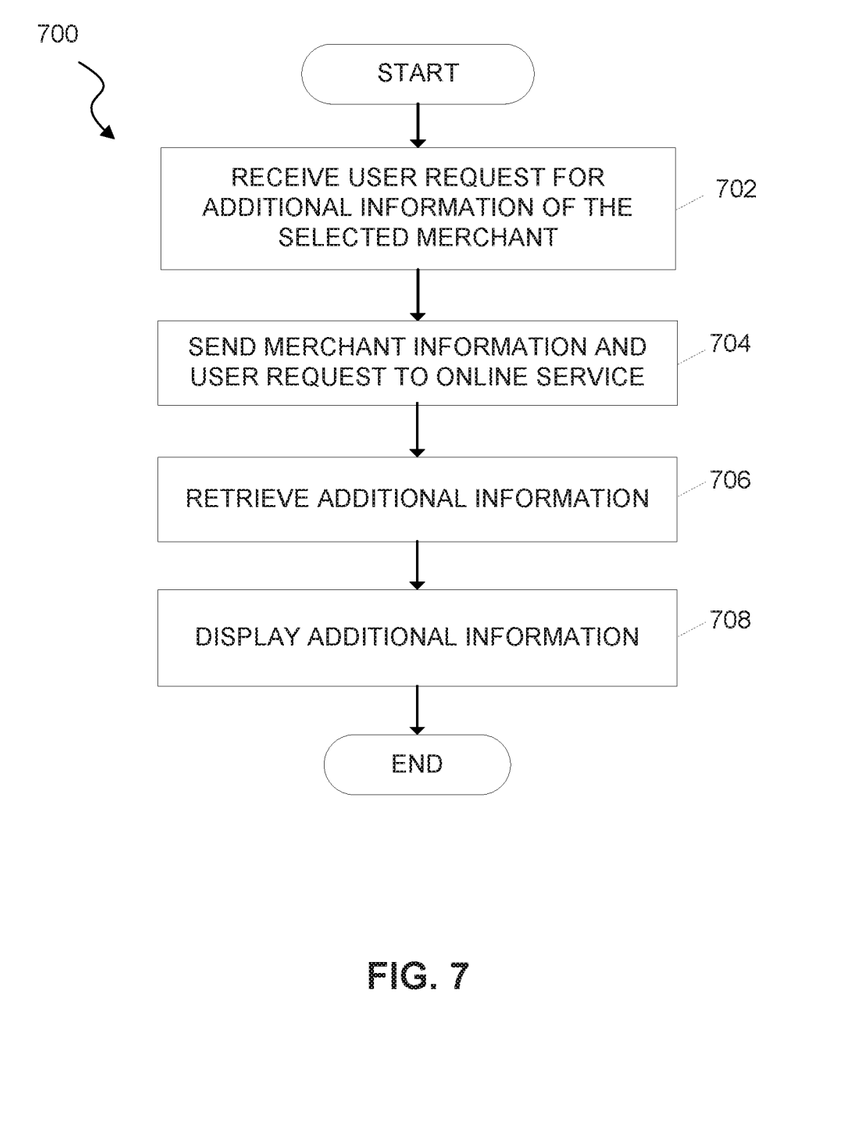
FIG. 7 is a exemplary flow chart for retrieving additional information of a business, consistent with the present invention.

Consistent with some embodiments of the present invention, business dialer system 100 may be further configured to obtain additional business information of a business selected in step 422 of process 400, in addition to dialing the selected business in step 424. FIG. 7 is a flow chart of an exemplary process 700 for performing a real-time search using online service to obtain additional business information.

Process 700 may begin when a user request for additional information of the selected business is received (step 702). For example, the user may press function button 205 for requesting the additional business information. User may also perform a pre-defined action, such as long-pressing, gesture, or clicking on a specific part of the selected object, to request additional information In some embodiments, the user request may specify the type of additional information to be obtained. Upon receiving the user request, a real-time search may be performed using online service 160. In some embodiments, processor 110 may establish a connection with online service 160 via communication interface 150, and send certain business information to online service 160 (step 704). For example, business identity information, such as name, location, and/or phone number, may be sent.

Processor 110 may retrieve the additional business information from online service 160 (step 706). For example, a map showing the location of the business and/or customer reviews about the business may be downloaded. The retrieved additional information may be displayed on display device 140 (step 708), and process 700 may terminate.

For purposes of explanation only, certain aspects and embodiments are described herein with reference to the components illustrated in FIGS. 1-7. The functionality of the illustrated components may overlap, however, and may be present in a fewer or greater number of elements and components. Further, all or part of the functionality of the illustrated elements may co-exist or be distributed among several geographically dispersed locations. Moreover, embodiments, features, aspects, and principles of the present invention may be implemented in various environments and are not limited to the illustrated environments.

Further, the sequences of events described in FIGS. 1-7 are exemplary and not intended to be limiting. Thus, other method steps may be used, and even with the methods depicted in FIGS. 1-7, the particular order of events may vary without departing from the scope of the present invention. Moreover, certain steps may not be present and additional steps may be implemented in FIGS. 1-7. Also, the processes described herein are not inherently related to any particular apparatus and may be implemented by any suitable combination of components.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A business dialer system to search for a business phone number and dial the business phone number, comprising:
    a user input device to detect an user input;
    a memory comprising instructions that, when executed by a processor coupled to the user input device, cause the processor to:
        generate a key sequence and a number sequence based on the detected user input;
        perform a search for business objects corresponding to the number sequence based on one or more data fields included in the business objects; and
    a display to display a user interface, the user interface including:
        an input display area to display the number sequence; and
        a search result area to display the business objects,
    wherein the user input interface detects a selection of a business object, among the business objects displayed in the user interface, or a dial command, and
    wherein the memory comprises instructions that cause the processor to:
        determine whether the selection of the business object or the dial command is detected;
        perform an action associated with the selected business object when the selection of the business object is detected; and
        dial the number sequence as a phone number when the dial command is detected without switching from the user interface displaying the number sequence and the business objects.

2. The system of claim 1, wherein the memory comprises instructions that cause the processor to: download the business objects corresponding to the number sequence from an online service upon a triggering event.

3. The system of claim 2, wherein the triggering event is one of:
    a change of the user location, wherein the business objects downloaded from the online service are associated with business entities within a predetermined distance from the user location;
    a change of information related to business objects previously stored and wherein the business objects downloaded from the online service are associated with the business entities that are changed; or
    a predetermined time internal having expired.

4. The system of claim 1, wherein the memory comprises instructions that cause the processor to search for contact objects and the business objects corresponding to the number sequence in parallel without having to switch context.

5. The system of claim 4, wherein the user interface further displays the contact objects and the business objects in different color or font in the user interface.

6. The system of claim 1, wherein the business objects contain location information of respective business entities, and wherein the memory comprises instructions that cause the processor to:
    detect a user location;
    rank the business objects based on distances between the user location and the respective business entities; and
    display, in the user interface, the business objects in a ranked order.

7. The system of claim 1, wherein the business objects are ranked based on a level of popularity associated with respective business entities, and wherein the user interface is configured to display the business objects in a ranked order.

8. The system of claim 1, wherein the business objects are displayed in the search result area in a ranked order based on a calling frequency associated with respective business entities.

9. The system of claim 1, wherein call log history is displayed in the area for displaying the business objects before the key sequence and the number sequence are generated.

10. The system of claim 1, wherein the memory comprises instructions that cause the processor to:
    count a number of the business objects identified from searching the memory;
    compare with a threshold number the counted number of business objects; and
    search online for additional business objects when the counted number of business object is less than the threshold number.

11. The system of claim 1, wherein the memory comprises instructions that cause the processor to clear the number sequence displayed in the user interface when the physical or a virtual key not associated with a number is detected.

12. A business dialing method implemented on a business dialer system to search for a business phone number and dial the business phone number, comprising:
    detecting a user input through a user input device;
    generating, by a processor, a key sequence and a number sequence based on the detected user input;
    perform a search for business objects corresponding to the number sequence based on one or more data fields included in the business objects;
    displaying the number sequence and the business objects on a user interface of a display device;
    detecting a selection of a business object, among the business objects displayed in the user interface, or a dial command;

determine whether the selection of the business object or the dial command is detected;

performing an action associated with the selected business object when the selection of the business object is detected; and dialing the number sequence as a phone number when the dial command is detected without switching from the user interface displaying the number sequence and the business objects.

13. The method of claim 12, further comprising downloading the business objects from an online service upon a triggering event; and storing the downloaded business objects in the memory.

14. The method of claim 13, wherein the triggering event is one of:

a change of the user location, wherein the business objects downloaded from the online service are associated with business entities within a predetermined distance from the user location;

a change of information related to business objects previously stored and wherein the business objects downloaded from the online service are associated with the business entities that are changed; or a predetermined time internal having expired.

15. The method of claim 12, further comprising:

count a number of the business objects identified from searching a memory;

compare with a threshold number the counted number of business objects; and search online for additional business objects when the counted number of business object is less than the threshold number.

16. The method of claim 12, further comprising:

searching for contact objects and the business objects corresponding to the number sequence in parallel without having to switch context;

displaying one or more contact objects related to the number sequence along with the business objects.

17. The method of claim 12, further comprising:

ranking the business objects, based on, distances between the user location and the respective business entities, or a calling frequency associated with respective business entities, or a level of popularity associated with respective business entities; and displaying the business objects in a ranked order.

18. The method of claim 12, wherein the processor is further configured to clear the number sequence displayed in the user interface when a user input not associated with a number is detected.

19. A non-transitory computer-readable device that stores a set of instructions which, when executed by a processor, performs a business dialer method implemented on a business dialer system to search for a business phone number and dial the business phone number, the method comprising:

detecting a user input on a user input device;

generating a key sequence and a number sequence based on the detected key presses;

searching a memory for business objects corresponding to the number sequence based on one or more data fields included in the business objects;

displaying the number sequence and the business objects on a user interface of a display device;

detecting a selection of a business object, among the business objects displayed in the user interface, or a dial command;

determining whether the selection of business object or the dial command is detected;

performing an action associated with the selected business object when the selection of the business object is detected; and dialing the number sequence as a phone number when the dial command is detected without switching from the user interface displaying the number sequence and the business objects.

20. The computer-readable device of claim 19, wherein the method further comprises:

ranking the business objects, based on, distances between the user location and the respective business entities, or a calling frequency associated with respective business entities, or a level of popularity associated with respective business entities; and displaying the business objects in a ranked order.

* * * * *

UNITED STATES PATENT AND TRADEMARK OFFICE
CERTIFICATE OF CORRECTION

PATENT NO. : 9,723,143 B2
APPLICATION NO. : 15/041204
DATED : August 1, 2017
INVENTOR(S) : Jialiang Wang et al.

It is certified that error appears in the above-identified patent and that said Letters Patent is hereby corrected as shown below:

On the Title Page

Item (73), in the Assignee, Line 1:
"(COO TEK)" should read --(COOTEK)--.

In the Claims

In Claim 1, Column 13, Line 34:
"detect an user input;" should read --detect a user input;--.

In Claim 3, Column 14, Line 9:
"time internal" should read --time interval--.

In Claim 10, Column 14, Line 47:
"number of business object" should read --number of business objects--.

In Claim 14, Column 15, Line 25:
"time internal" should read --time interval--.

In Claim 15, Column 15, Line 27:
"count a number" should read --counting a number--.

In Claim 15, Column 15, Line 29:
"compare with a threshold number" should read --comparing with a threshold number--.

In Claim 15, Column 15, Line 31:
"search online" should read --searching online--.

In Claim 15, Column 15, Line 32:
"number of business object" should read --number of business objects--.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,723,143 B2

In Claim 17, Column 15, Line 41:
"objects, based on, distances" should read --objects based on distances--.

In Claim 19, Column 16, Line 24:
"selection of business object" should read --selection of the business object--.

In Claim 20, Column 16, Line 35:
"objects, based on, distances" should read --objects based on distances--.